(12) United States Patent
Wu et al.

(10) Patent No.: US 11,244,171 B2
(45) Date of Patent: Feb. 8, 2022

(54) VIDEO-BASED SYSTEM FOR AUTOMATED DETECTION OF DOUBLE PARKING VIOLATIONS

(71) Applicant: Conduent Business Services, LLC, Dallas, TX (US)

(72) Inventors: Wencheng Wu, Webster, NY (US); Edgar A. Bernal, Webster, NY (US); Yao Rong Wang, Webster, NY (US); Zhigang Fan, Webster, NY (US); Robert P. Loce, Webster, NY (US)

(73) Assignee: Conduent Business Services LLC, Dallas, TX (US)

( * ) Notice: Subject to any disclaimer, the term of this patent is extended or adjusted under 35 U.S.C. 154(b) by 1175 days.

(21) Appl. No.: 14/161,016

(22) Filed: Jan. 22, 2014

(65) Prior Publication Data
US 2015/0206014 A1  Jul. 23, 2015

(51) Int. Cl.
*H04N 7/18* (2006.01)
*B60Q 1/44* (2006.01)
*G06K 9/00* (2006.01)
*G08G 1/16* (2006.01)
*G06K 9/20* (2006.01)

(52) U.S. Cl.
CPC ..... *G06K 9/00771* (2013.01); *G06K 9/00812* (2013.01); *G06K 9/2054* (2013.01); *G06K 9/2072* (2013.01); *G08G 1/168* (2013.01); *H04N 7/183* (2013.01)

(58) Field of Classification Search
CPC .. H04N 7/183; G06K 9/0071; G06K 9/00771; G06K 9/00335; G06K 9/00228; G06K 9/00369; G06K 9/00624; G06K 2209/23; G08G 1/00; G08G 1/168
See application file for complete search history.

(56) References Cited

U.S. PATENT DOCUMENTS

| 5,809,161 | A | * | 9/1998 | Auty | G01P 3/38 |
| | | | | | 340/937 |
| 7,046,822 | B1 | * | 5/2006 | Knoeppel | B60W 30/16 |
| | | | | | 382/103 |
| 8,120,513 | B2 | | 2/2012 | Ioli | |
| 2003/0076417 | A1 | | 4/2003 | Thomas et al. | |

(Continued)

OTHER PUBLICATIONS

Srinivas et al., "Image Processing Edge Detection Technique Used for Traffic Control Problem", Int'l Journal of Computer Science and Information Technologies, vol. 4 (1), 17-20 (2013).

(Continued)

*Primary Examiner* — Patrick E Demosky
(74) *Attorney, Agent, or Firm* — Fay Sharpe LLP

(57) ABSTRACT

A method for detecting a double-parked vehicle includes identifying a parking region in video data received from an image capture device monitoring the parking region. The method includes defining an enforcement region at least partially surrounding the parking region. The method includes detecting a stationary vehicle in the enforcement region. The method includes determining the occurrence of an event relative to the stationary vehicle. In response to the determined occurrence of the event, the method includes classifying the stationary vehicle as being one of double parked and not double parked.

24 Claims, 11 Drawing Sheets

(56) References Cited

U.S. PATENT DOCUMENTS

| | | | | |
|---|---|---|---|---|
| 2005/0104958 | A1* | 5/2005 | Egnal | G01S 3/7864 |
| | | | | 348/143 |
| 2009/0033745 | A1* | 2/2009 | Yeredor | G01S 3/7864 |
| | | | | 348/152 |
| 2009/0138186 | A1* | 5/2009 | Ray | G08G 1/0104 |
| | | | | 701/117 |
| 2010/0063663 | A1* | 3/2010 | Tolstedt | G05D 1/0231 |
| | | | | 701/23 |
| 2010/0253594 | A1* | 10/2010 | Szczerba | G01S 13/723 |
| | | | | 345/7 |
| 2011/0063131 | A1* | 3/2011 | Toledo | B62D 15/027 |
| | | | | 340/932.2 |
| 2012/0044066 | A1* | 2/2012 | Mauderer | B60T 7/22 |
| | | | | 340/479 |
| 2012/0112929 | A1* | 5/2012 | Gupta | G08G 1/146 |
| | | | | 340/932.2 |
| 2012/0177121 | A1* | 7/2012 | Tripathi | G06T 7/20 |
| | | | | 375/240.16 |
| 2013/0261958 | A1* | 10/2013 | Herron | G07B 15/02 |
| | | | | 701/428 |
| 2013/0265419 | A1 | 10/2013 | Wu et al. | |
| 2013/0266185 | A1* | 10/2013 | Bulan | G06K 9/00771 |
| | | | | 382/104 |
| 2014/0036076 | A1* | 2/2014 | Nerayoff | H04N 7/181 |
| | | | | 348/148 |
| 2014/0309917 | A1* | 10/2014 | Beaurepaire | G08G 1/017 |
| | | | | 701/300 |
| 2015/0039173 | A1* | 2/2015 | Beaurepaire | B60W 30/06 |
| | | | | 701/23 |
| 2015/0339920 | A1* | 11/2015 | Cortelyou | G08G 1/01 |
| | | | | 340/907 |

OTHER PUBLICATIONS

Dangi et al., "Image Processing Based Intelligent Traffic Controller", Academic Research Journal, vol. 1 (1) (2012).

"Student-designed System Would Warn Drivers About Emergency Vehicles", University of Windsor, http://www.uwindsor.ca/dailynews/2013-08-09/student-designed-system-would-warn-drivers-about-emergency-vehicles, downloaded from the Internet Jan. 22, 2014.

Wu, U.S. Appl. No. 13/611,718, Video-Tracking for Video-Based Speed Enforcement, filed Sep. 12, 2012.

* cited by examiner

VIDEO-BASED SYSTEM FOR AUTOMATED DETECTION OF DOUBLE PARKING VIOLATIONS

BACKGROUND

The present disclosure relates to a system and method for determining double parking violations by confirming the occurrence of an event relative to a detected vehicle that is parked in an enforcement area. However, it is appreciated that the present exemplary embodiments are also amendable to other like applications.

Municipalities regulate parking in certain areas for public safety and ease of access reasons. Areas that prohibit vehicles from parking and/or stopping are denoted as exclusion zones. Double parking is defined as parking a vehicle alongside another vehicle that is already parked at the side of the road, and it can be highly disruptive to traffic flow.

Infractions of double parking regulations are among the most commonly occurring parking violation. In larger municipalities, about one-third of infractions can occur in exclusion zones. Substantial fines to the violators can generate significant revenue for municipalities. However, because double parking is typically enforced manually, usually by police officers, the detection of exclusion zone infractions is costly in labor and can result in lost revenues when infractions go undetected. In an effort to reduce costs and improve efficiency, municipalities are exploring the use of new technologies for automating exclusion zone enforcement.

Non-stereoscopic video cameras have been proposed to monitor on-street parking, where one video camera located near a parking region can monitor and track the entire area. Maintenance of video cameras is also less disruptive to street traffic. Co-pending and commonly assigned application U.S. Publication No. 2013/0266185, entitled "Video-Based System and Method for Detecting Exclusion Zone Infractions", filed Apr. 6, 2012, introduced a video-based method operable to analyze frames in a video feed for determining a parking violation. A vehicle is located in a defined exclusion zone using a background subtraction method. Then, the duration that the detected vehicle remained stationary in the exclusion zone is calculated based on a number of frames including the detected vehicle. If the duration meets and/or exceeds a threshold, the stationary vehicle is classified as being double parked.

While the '185 publication addresses exclusion zone monitoring as a special case of automated traffic law enforcement, it does not consider special factors within an exclusion zone setting that can affect accuracy. Particularly, the '185 publication teaches that a detected, stationary vehicle can be classified as violating an exclusion zone without considering whether or not the vehicle is voluntarily stationary.

There is a need for a system and method that uses video data for detecting voluntary double parking infractions. Particularly, a system and method is desired to analyze the occurrence of an additional relevant event relative to a detected vehicle.

INCORPORATION BY REFERENCE

The disclosure of co-pending and commonly assigned U.S. Published Application No. 2013/0266185, entitled "Video-Based System and Method for Detecting Exclusion Zone Infractions", filed Apr. 6, 2012", by Orhan Bulan, et al., is totally incorporated herein by reference.

The disclosure of co-pending and commonly assigned U.S. Published Application No. 2013/0265419, entitled, "A System And Method For Available Parking Space Estimation For MultiSpace On-Street Parking", filed Apr. 6, 2012, by Orhan Bulan, et al., is totally incorporated herein by reference.

The disclosure of co-pending and commonly assigned U.S. Ser. No. 13/611,718, entitled "Video-Tracking for Video-Based Speed Enforcement", filed Sep. 12, 2102, by Wencheng Wu, et al., is totally incorporated herein by reference.

The disclosure of "Image Processing Edge Detection Technique used for Traffic Control Problem," P. Srinivas, et al., International Journal of Computer Science and Information Technologies, Vol. 4 (1), 17-20 (2013) is totally incorporated herein by reference.

The disclosure of "Image Processing Based Intelligent Traffic Controller", Vikramaditya Dangi, et al., Academic Research Journal, Vol. 1 (1) (2012) is totally incorporated herein by reference.

The disclosure of http://www.uwindsorca/dailynews/2013-08-09/student-designed-system-would-warn-drivers-about-emergency-vehicles is totally incorporated herein.

BRIEF DESCRIPTION

The present disclosure teaches a method for detecting a double-parked vehicle. One embodiment of the method includes identifying a parking region in video data received from an image capture device monitoring the parking region. The method includes defining an enforcement region at least partially surrounding the parking region. The method includes detecting a stationary candidate double-parked vehicle in the enforcement region. The method includes determining the occurrence of an event relative to the stationary vehicle. In response to the determined occurrence of the event, the method includes classifying the stationary vehicle as being one of double parked and not double parked.

The disclosure also teaches a system for detecting a double-parked vehicle. The system includes a double parking confirmation device including a memory for storing a region determination module, a vehicle detection module, and a vehicle classification module. A processor is in communication with the memory and is operative to execute the modules. The region determination module is operative to identify a parking region and an enforcement region at least partially surrounding the parking region in a sequence of frames received from an image capture device monitoring the parking region. The vehicle detection module is operative to detect a stationary candidate double-parked vehicle in the enforcement region. The vehicle classification module is operative to determine an occurrence of an event relative to the stationary vehicle. In response to the determined occurrence of the event, the vehicle classification module classifies the stationary vehicle as being one of double parked and not double parked.

DETAILED DESCRIPTION

The present disclosure relates to a video-based method and system for determining double parking violations by determining the occurrence of an event relative to a detected vehicle that is parked in an enforcement area. The system includes an image capture device that monitors an enforcement area, near or adjacent a parking area, and processes video data, or transmits the video data to a central processor, for determining whether a stationary candidate double-parked vehicle is double parked in the enforcement area.

Figure 1A:
FIG. 1A shows an example parking area.
Figure 1B:
FIG. 1B shows an example enforcement area.

FIGS. 1A and 1B show an example scenario where the present disclosure can be applied to determine whether a vehicle is double parked in an exclusion zone enforcement area. FIG. 1A shows an example parking region being monitored as a virtual outline P. FIG. 1B shows an example enforcement region being monitored as a virtual outline E. In the illustrated example, the enforcement area is a driving lane located next to the parking lane. Where the parking area may be full along one extent and there are no available spaces, vehicles may be tempted to temporarily park and/or stop in the driving lane near or next to the parked vehicles. Albeit, vehicles may be tempted to double park for other reasons of convenience regardless of the occupancy of the parking area. In the illustrated embodiments, a violation in the exclusion zone may also occur when a vehicle is detected as being parked in an exclusion zone adjacent to a parking area, regardless of whether the parking area is occupied or not. Furthermore, the exclusion zone may not be located adjacent a parking area, but is rather located adjacent a driveway or a fire hydrant or in a lane that is designated for parking during certain hours and designated for traffic during other hours, such as rush hour, etc. A vehicle is parked in an exclusion zone where it is detected as being stopped in an enforcement area that is not meant for parked vehicles.

Figure 2:
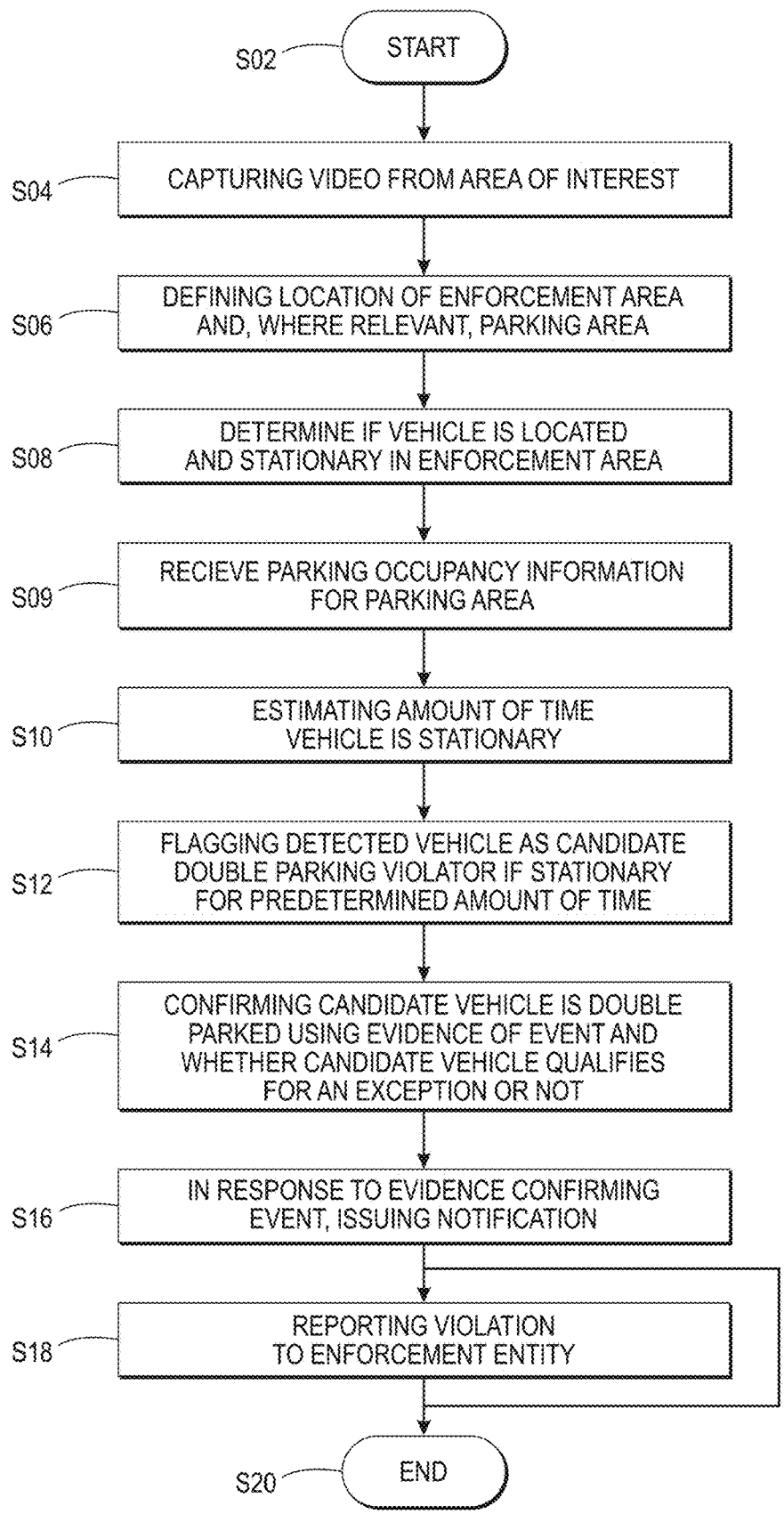
FIG. 2 is an overview of a method for determining a parking violation.

Frames provided by the image capture device are analyzed to identify the vehicles that double park in the enforcement area. The processing can be executed on embedded camera hardware or in a central processor. Part of this analysis includes a verification operation to determine whether a candidate double parked vehicle is indeed double parked and/or subject of an infraction. FIG. 2 is an overview of the analysis. The process starts at S02. Video is captured from an area of interest at S04. Within each frame that is analyzed, locations of the parking area and the enforcement area are defined at S06. Mainly, the location of the enforcement area is defined in certain embodiments, whereby the location of the parking area is also defined in other embodiments where relevant. Pixels are analyzed to determine whether a vehicle is located and stationary in the enforcement area at S08. Where the parking area is being simultaneously monitored, the system can optionally receive parking occupancy information for the location of the parking area at S09. Co-pending and commonly assigned U.S. Published Application No. 2013/0265419, entitled, "A System And Method For Available Parking Space Estimation For MultiSpace On-Street Parking", filed Apr. 6, 2012, by Orhan Bulan, et al., describes a process for obtaining this parking information and is totally incorporated herein by reference.

The amount of time that the detected vehicle remains stationary is estimated by counting a number of frames the detected vehicle does not move at S10. If the vehicle is parked in the enforcement area for a duration meeting or exceeding a predetermined threshold, the detected vehicle is flagged as a candidate double parking violator at S12. Evidence of an occurrence of an event and whether the vehicle qualifies for an exception or not is checked to confirm that the candidate double parking violator is indeed double parked at S14. This event can include, for example, a detection of hazard lights operating on the stationary candidate double-parked vehicle or objects stopped in front of the stationary vehicle. This event can include an analysis of traffic patterns around the stationary vehicle. For example, moving vehicles are tracked within the scene. If an event is detected, notification of the violation is issued at S16. Other conditions may be imposed before a violation notification is triggered. The violation can be subsequently reported to an enforcement entity at S18. Examples of exceptions include an emergency vehicle identified through emergency lights, written identification or other vehicle classification techniques. In contemplated embodiments, hazard lights can indicate the occurrence of a violation, whereas emergency lights can indicate the presence of an exception.

Note that in the situation where the parking area is being monitored (i.e., S09 is being performed), the received parking occupancy information may be used to adjust the processing at one or both of S10 or S14. For example, the timer at S10 may start only if the parking occupancy of the parking area next to the enforcement zone is full. In another example, the parking occupancy of the parking area next to or near the detected stationary candidate double-parked vehicle may be used to adjust the confidence of, and/or confirm, the candidate vehicle is indeed double parked at S14. The method ends at S20.

Figure 3:
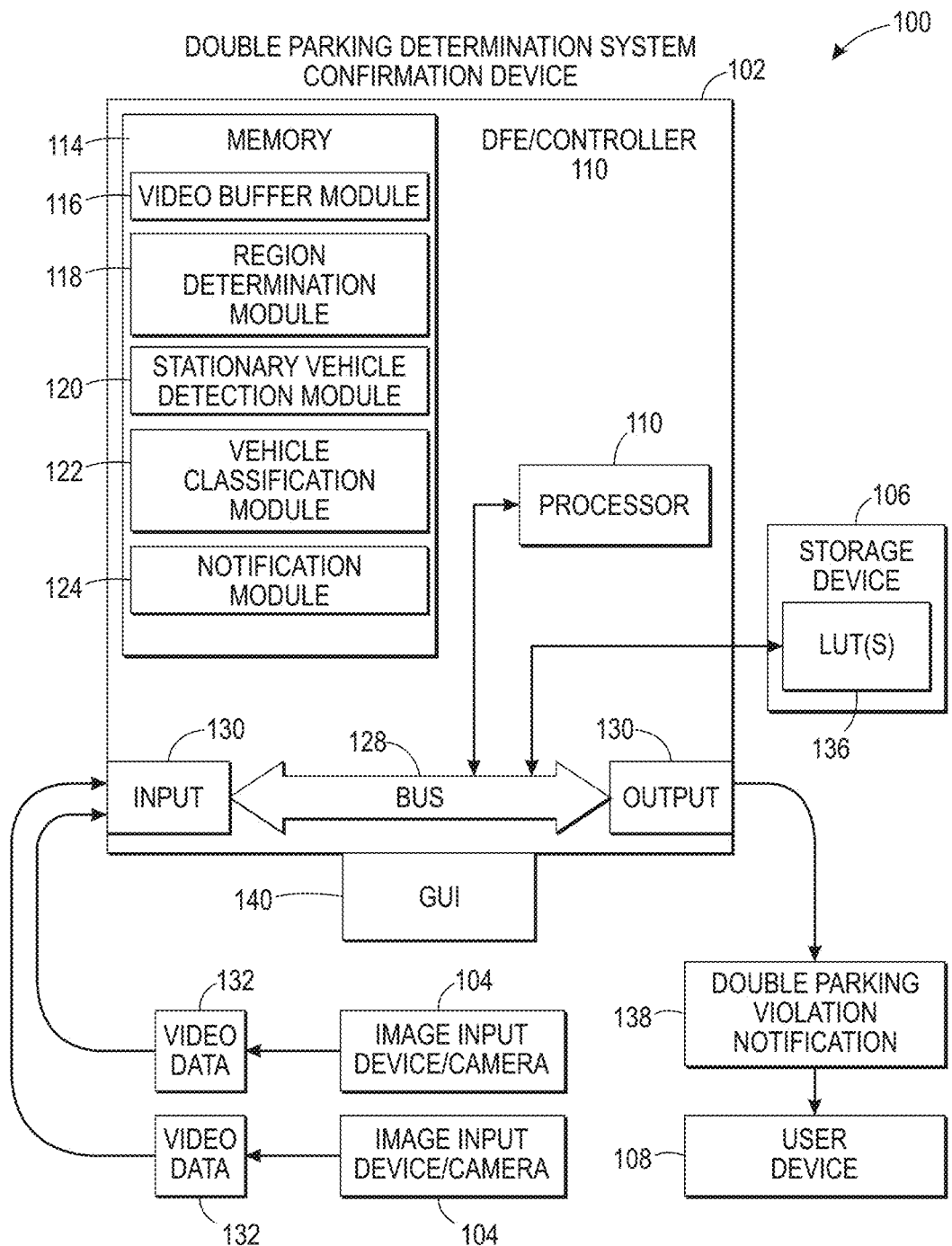
FIG. 3 is a schematic illustration of a double parking determination system 100 in one exemplary embodiment.

FIG. 3 is a schematic illustration of a double parking determination system 100 in one exemplary embodiment. The system includes a double parking confirmation device 102 ("confirmation device"), an image capture device 104, and a storage device 106, which may be linked together by communication links, referred to herein as a network. In one embodiment, the system 100 may be in further communication with a user device 108. These components are described in greater detail below.

The confirmation device 102 illustrated in FIG. 3 includes a controller 110 that is part of or associated with the confirmation device 102. The exemplary controller 110 is adapted for controlling an analysis of video data received by the system 100 by classifying the pixels in each static frame. The controller 110 includes a processor 112, which controls the overall operation of the determination device 102 by execution of processing instructions that are stored in memory 114 connected to the processor 112.

The memory 114 may represent any type of tangible computer readable medium such as random access memory (RAM), read only memory (ROM), magnetic disk or tape, optical disk, flash memory, or holographic memory. In one embodiment, the memory 114 comprises a combination of random access memory and read only memory. The digital processor 112 can be variously embodied, such as by a single-core processor, a dual-core processor (or more generally by a multiple-core processor), a digital processor and cooperating math coprocessor, a digital controller, or the like. The digital processor, in addition to controlling the operation of the determination device 102, executes instructions stored in memory 114 for performing the parts of the method outlined in FIGS. 2, 4, 6A-6C, and 8A-8B. In some embodiments, the processor 112 and memory 114 may be combined in a single chip.

The confirmation device 102 may be embodied in a networked device, such as the image capture device 104, although it is also contemplated that the confirmation device 102 may be located elsewhere on a network to which the system 100 is connected, such as on a central server, a networked computer, or the like, or distributed throughout the network or otherwise accessible thereto. The video data analysis and double parking determination phases disclosed herein are performed by the processor 112 according to the instructions contained in the memory 114. In particular, the memory 114 stores a video buffer module 116, which captures video data of a parking area of interest; a region determination module 118, which identifies a parking region and an enforcement region at least partially surrounding the parking region in a sequence of frames received from an image capture device monitoring the parking region; a vehicle detection module 120, which detects a stationary candidate double-parked vehicle in the enforcement region; a vehicle classification module 122, which determine an occurrence of an event relative to the stationary vehicle and classifies the stationary vehicle as being one of double parked and not double parked; and, a notification module 124, which notifies a user of the infraction. Embodiments are contemplated wherein these instructions can be stored in a single module or as multiple modules embodied in the different devices. The modules 116-124 will be later described with reference to the exemplary method.

The software modules as used herein, are intended to encompass any collection or set of instructions executable by the confirmation device 102 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the determination device 102 may be all connected by a bus 128.

With continued reference to FIG. 3, the confirmation device 102 also includes one or more communication interfaces 130, such as network interfaces, for communicating with external devices. The communication interfaces 130 may include, for example, a modem, a router, a cable, and/or Ethernet port, etc. The communication interfaces 130 are adapted to receive video and/or video data 132 as input.

The confirmation device 102 may include one or more special purpose or general purpose computing devices, such as a server computer or digital front end (DFE), or any other computing device capable of executing instructions for performing the exemplary method.

FIG. 3 further illustrates the confirmation device 102 connected to an image source 104 for inputting and/or receiving the video data and/or image data (hereinafter collectively referred to as "video data") in electronic format. The image source 104 may include an image capture device, such as a camera. The image source 104 can include one or more surveillance cameras that capture video data from the parking area of interest. For performing the method at night in parking areas without external sources of illumination, the cameras 104 can include near infrared (NIR) capabilities at the low-end portion of a near-infrared spectrum (700 nm-1000 nm). No specific requirements are needed regarding spatial or temporal resolutions. The image source, in one embodiment, can include a traditional surveillance camera with a video graphics array size that is about 640 pixels wide and 480 pixels tall with a frame rate of fifteen (15) or more frames per second.

In one embodiment, the image source 104 can be a device adapted to relay and/or transmit the video captured by the camera to the confirmation device 102. For example, the image source 104 can include a scanner, a computer, or the like. In another embodiment, the video data 132 may be input from any suitable source, such as a workstation, a database, a memory storage device, such as a disk, or the like. The image source 104 is in communication with the controller 110 containing the processor 112 and memories 114.

With continued reference to FIG. 3, the system 100 includes a storage device 106 that is part of or in communication with the confirmation device 102. In a contemplated embodiment, the confirmation device 102 can be in communication with a server (not shown) that includes a processing device and memory, such as storage device 106, or has access to a storage device 106, for storing look-up tables (LUTs) that map pixel data to actual distance data, for containing time tables regarding stop light data, and for containing information regarding exceptions such as for certain emergency and commercial vehicles. Examples of exceptions include an emergency vehicle identified through emergency lights, written identification or other vehicle classification techniques. Note that hazard lights can indicate the occurrence of a violation, whereas emergency lights can indicate the presence of an exception. Examples of exceptions can also include commercial vehicles which can be identified through computer vision techniques for vehicle classification into categories including tractor-trailer, box trucks and delivery vans. Mainly, these vehicles can be identified using techniques known in the art. One example technique includes extracting features of a detected vehicle in the image frame and applying the features to at least one trained vehicle classifier, which is operative to classify the detected vehicle as belonging to a particular vehicle type and/or category.

With continued reference to FIG. 3, the video data 132 undergoes processing by the confirmation device 102 to output a determination 138 regarding double parking violation to an operator in a suitable form on a graphic user interface (GUI) 140 or to a user device 108, such as a smart phone belonging to a driver in transit or to vehicle computer and/or GPS system, that is in communication with the confirmation device 102. The GUI 140 can include a display for displaying the information, to users, and a user input device, such as a keyboard or touch or writable screen, for receiving instructions as input, and/or a cursor control device, such as a mouse, trackball, or the like, for communicating user input information and command selections to the processor 112.

Figure 4:
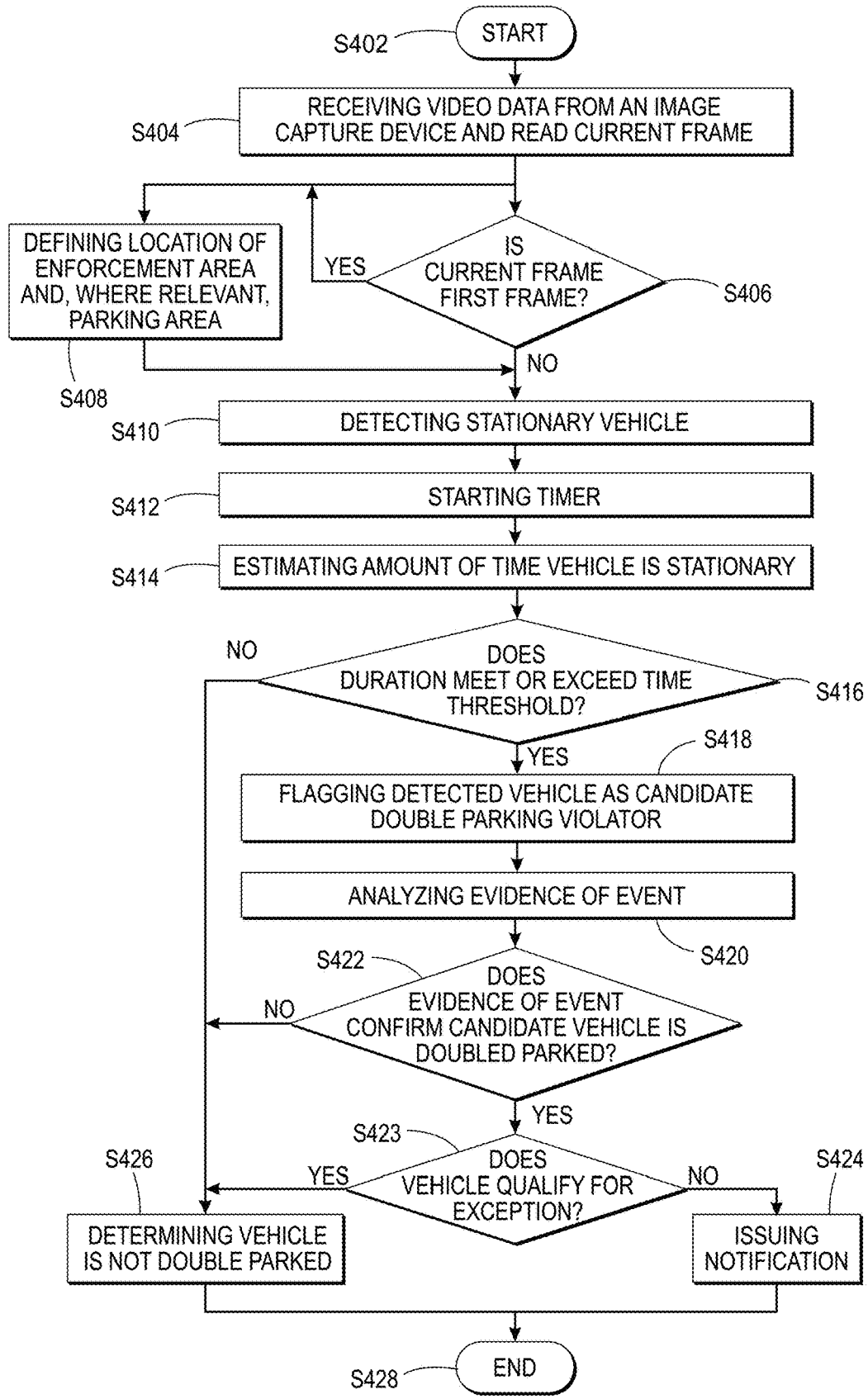
FIG. 4 is a detailed flowchart describing the method for determining a double parking violation.

FIG. 4 is a detailed flowchart describing an embodiment of the method 400 for determining a double parking violation. The method starts at S402. The video buffer module 116 receives video data from a sequence of frames taken from the image capture device 104 at S404. The vehicle buffer module 116 determines whether the current frame is the first frame at S406. In response to the current frame being the first frame in the sequence (YES at S406), the video buffer module transfers the video data to a region determination module 118, which identifies a parking region and/or an enforcement region at least partially surrounding the parking region in a sequence of frames at S408. By 'partially surrounding', the enforcement region can extend adjacent to the parking region along at least a portion of the parking region. In one embodiment, this determination (S408) is performed once, for the initial frame in the sequence, and may be updated only if/when the camera field of view changes (e.g., if camera is moved).

In a scenario where parking occupancy is being monitored, both the parking and enforcement regions are defined. In the illustrated embodiment, the parking region may be a curbside parking lane, and the enforcement region can be a driving lane located next to the parking lane. In FIG. 1B, the enforcement area is defined relative to the on-street parking area. Although FIG. 1B illustrates a single-lane traffic scenario, the disclosure can be readily extended to multi-lane traffic scenarios. In a contemplated embodiment, however, only the location of the enforcement area may be independently specified. When double parking is alone being enforced, only the location of the enforcement area is needed.

The disclosure of co-pending and commonly assigned U.S. Published Application No. 2013/0266185, entitled "Video-Based System and Method for Detecting Exclusion Zone Infractions", filed Apr. 6, 2012", by Orhan Bulan, et al., describes a process for defining regions in the video data, and is totally incorporated herein by reference. One aspect of the region determination module 118 identifying the region(s) is that the process can be performed only for pixels located in or near the regions, thus reducing computational power requirements. Embodiments are contemplated, however, where the process is performed on an entire frame instead of in or near the identified regions.

In response to the current frame not being the first frame in the sequence (NO at S406), the video buffer module 116 transmits the video data to the stationary vehicle detection module 120 for performing vehicle detection at S410.

Alternatively, where one or both regions are determined manually (by camera operators) at the time of camera installation, at runtime, offline using real time video processing, or are periodically updated, manually, offline or at runtime, after receiving the video data at S404, the region determination module 118 identifies the parking region and/or an enforcement region for the sequence of frames at S408 using alternative methods regardless of whether the current frame is an initial frame.

Figure 8A:
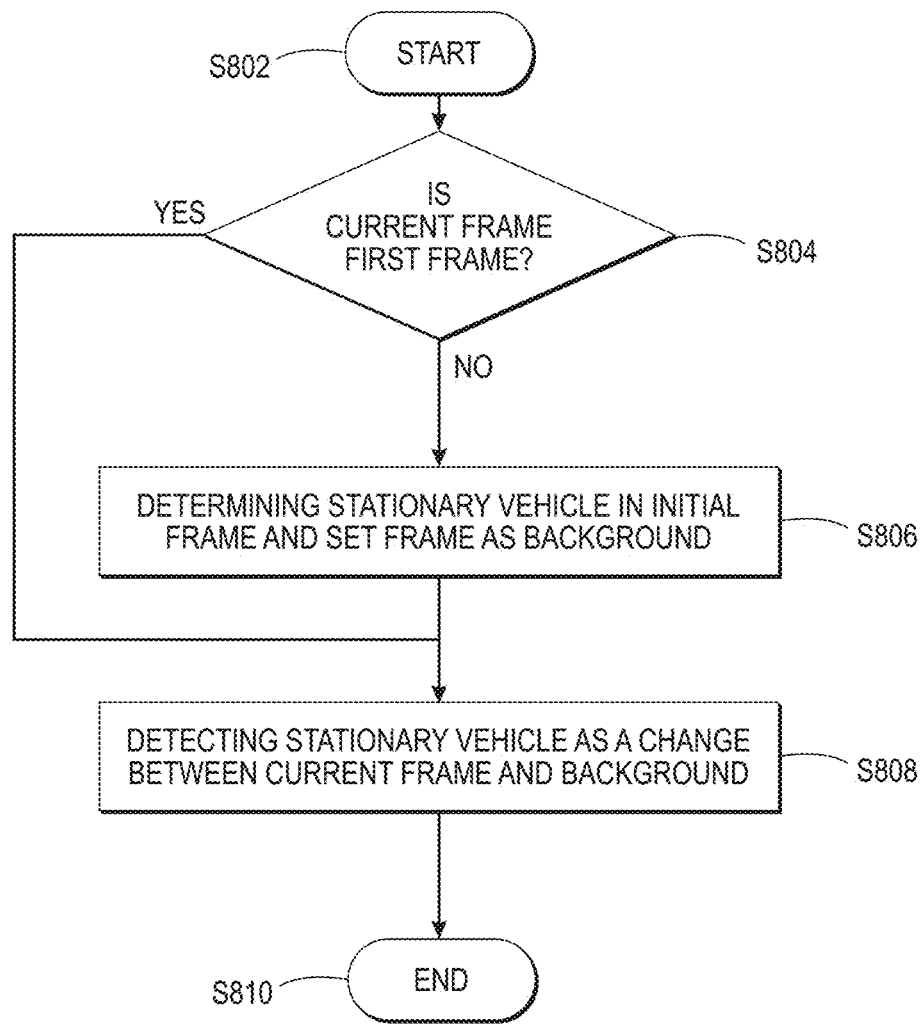
FIG. 8A shows a method for detecting a stationary vehicle in an exclusion zone or parking area.

There is no limitation made herein for how a stationary, candidate double-parked vehicle is detected. One example method for detecting a stationary vehicle within the defined regions is shown in FIG. 8A. The method starts at S802. The vehicle detection module 120 determines whether the current frame is the first frame at S804. In response to the current frame being the first frame in the sequence (YES at S804), the module 120 performs an initialization process at S806 by detecting a parked vehicle in the frame and setting the first frame as a background. The initialization process is described in U.S. Publication No. 2013/0265419. The initialization process estimates vehicle occupancy in the parking area and/or enforcement area at a start of the video feed or at a later frame using a static image captured in the initial frame. Generally, the initialization process determines the positions of the parked vehicles in the initial frame to detect objects and/or vehicles that are already present in the parking area.

In response to the current frame not being the first frame in the sequence (NO at S804), the stationary vehicle detection module 120 detects vehicles that park in the enforcement area or leave the enforcement area at S808 in subsequent frames. The vehicle detection module 120 detects the presence of vehicles in the enforcement area by maintaining an estimate of the scene background and by performing background subtraction on a frame-by-frame basis. Once the background is estimated, the vehicles that park in or leave the enforcement area, after the initialization process at S806, are detected by subtracting the selected frame from the estimated background and applying thresholding and/or morphological operations on the difference image. At each frame, the stationary vehicle detection module 120 detects movement of vehicles using temporal difference methods to check whether the detected vehicle is stationary or in motion. U.S. Ser. No. 13/441,269, the content of which is fully incorporated herein, describes a background estimation (and alternative) process(es) for vehicle detection. The background estimation process described in U.S. Ser. No. 13/441,269 classifies objects and/or vehicles based on the difference in intensity between frames.

The stationary vehicle detection module 120 uses the classifications to assign values to each pixel and then uses the assigned values to generate a binary image representing the current frame. The system uses the binary information for updating the background in each next frame of the sequence. The updated background is used by the system to determine when the initially parked vehicle subsequently moves away from and/or leaves the parking space, or when a new vehicle enters the scene.

By detecting motion via double differencing, areas of occlusion, caused by moving vehicles traveling adjacent to the parking area or enforcement area, can be discarded. Occlusions caused by stationary vehicles can be detected. And computer vision techniques can be performed on objects that straddle both the parking and enforcement areas. The method ends at S810.

Figure 5:
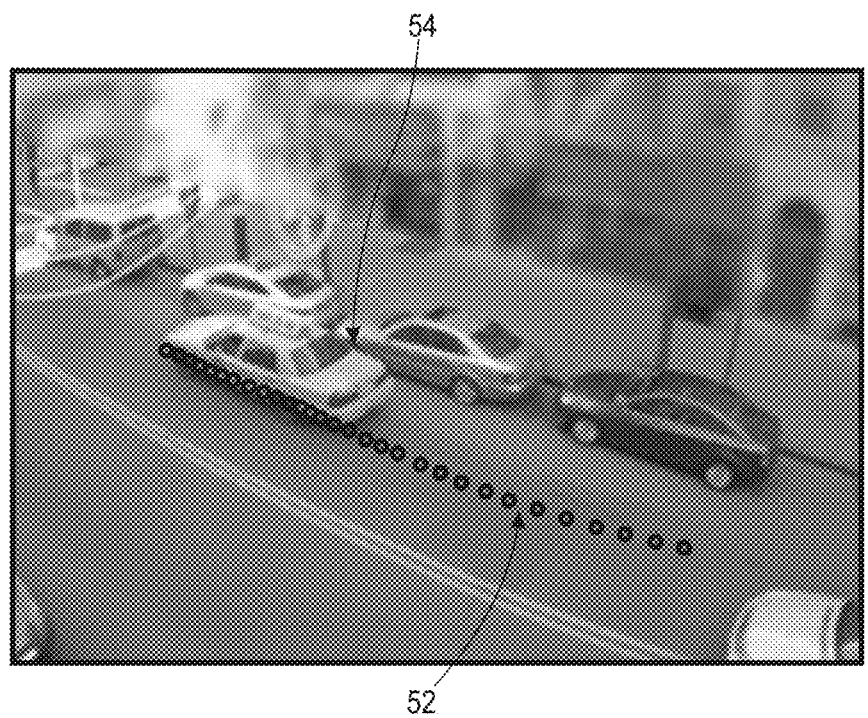
FIG. 5 shows an example of a vehicle being tracked as it traverses the enforcement area.
Figure 8B:
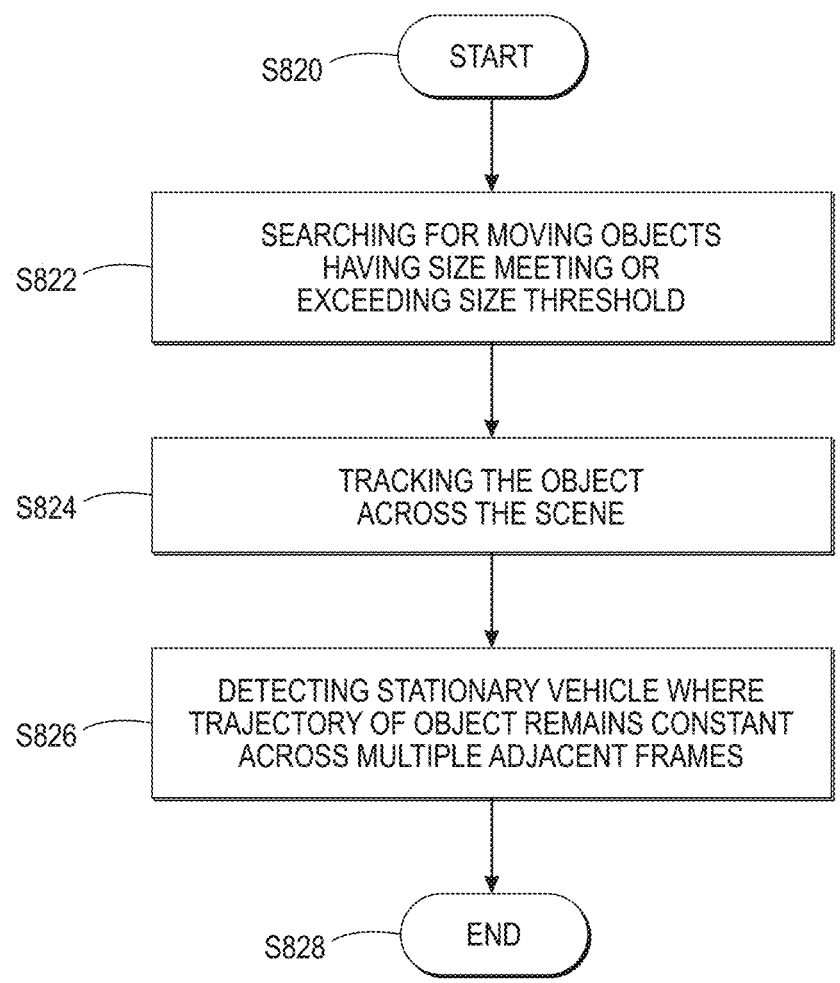
FIG. 8B shows a method for detecting a stationary vehicle in a traffic lane-enforcement area.

FIG. 8B shows another example method for detecting a stationary vehicle in a traffic lane-enforcement area, i.e., the enforcement area for this example. The method starts at S820. The stationary vehicle detection module 120 detects the presence of a vehicle by detecting motion where the vehicle enters, or appears in, the enforcement area. FIG. 1B shows the direction of traffic starting on the right side and moving toward the left side of the frame, and the module 120 searches for motion at the extreme of the enforcement area where traffic enters, or first appears in, the scene at 50. Particularly, the module 20 is searching for moving objects having a size meeting or exceeding a predetermined threshold at S822. A tracking algorithm is initialized on one of the features of or the entire detected object to trigger motion detection at S824. As a vehicle traverses the enforcement area, the location of the tracker 52, represented as virtual marks in FIG. 5, in the image/frame corresponds with the location history of the vehicle 54 in the scene. The stationary vehicle module 120 detects a stationary vehicle when the tracker remains constant across multiple adjacent frames at S826. An entire region occupied by a vehicle may not be necessary for this approach, although embodiments are contemplated where the system collects evidence information before, during, or after the analyses for issuing a notification. In this embodiment, the system can determine an approximate region located where the tracked vehicle becomes stationary. By determining the entire region, the system can also verify that the detected stationary vehicle is indeed a vehicle by comparing feature size characteristics to a predetermined size threshold. U.S. Ser. No. 13/611,718, entitled "Video-Tracking for Video-Based Speed Enforcement", filed Sep. 12, 2102, by Wencheng Wu, the content of which is fully incorporated herein, describes a technique for determining image regions including computer vision techniques. Alternatively, image segmentation can be used.

In more specific detail, the tracking is achieved by identifying pixel clusters (i.e., "objects") detected using a frame-by-frame differencing process followed by morphological filtering to remove spurious sources of motion and noise in a motion detection area. When a substantial portion of the object enters a certain area (illustrated in FIG. 5 in the lower right section of the frame), the tracking algorithm described in U.S. Ser. No. 13/611,718 is activated. Particularly, a triggering mask of sufficient size is used to detect a vehicle entering the scene. Simultaneously, the trajectories of other vehicles moving through the scene are also tracked to determine if any trajectory moves to an adjacent lane and around the detected vehicle. The travel direction and distance of each candidate trajectory can be algorithmically examined to remove false positives.

The tracking algorithm can recover from temporarily dropped trackers for up to a predetermined number of frames. In other words, the tracking of the object of interest can be dropped for a predetermined amount of time corresponding to the number of frames. This allowance enables the system to deal with short-term occlusions, since another vehicle can occlude the detected stationary vehicle for a short period of time when it moves around the detected stationary vehicle. The tracking can cease if the trajectory of the object of interest is lost for more than the predetermined number of frames and/or amount of time.

Furthermore, the tracking can cease if the trajectory of the object of interest approaches an exit point in the scene, which can be known as a predetermined number of pixels from the frame boundary. The method ends at S828.

Returning to FIG. 4, in response to detecting a stationary vehicle in the enforcement region, such as when the trajectory becomes stationary, a timer starts at S412. The stationary vehicle detector 120 estimates an amount of time the detected vehicle remains stationary at S414. The duration is estimated because a stationary vehicle detected in the enforcement area becomes a candidate double parking violator, in one embodiment, if it does not move for predetermined length of time. When the timer starts, an image segmentation algorithm is applied locally around the monitored point to further identify the region that the stationary vehicle occupies. A virtual box 82 indicating the segmentation result can be displayed on the frame and the output 84 of the timer can also be displayed, as shown in the sample frames of FIG. 7B.

In the discussed embodiment where the stationary vehicle is detected using background estimation (FIG. 8A), the duration the vehicle remains stationary can be estimated by determining an image patch (of pixels) corresponding to a location of the vehicle, represented as a foreground object, in a first frame corresponding to when the vehicle is first identified and stops. In subsequent frames, a normalized cross-correlation is performed between the image patch and regions in and around the location where the vehicle was originally identified. In response to the cross-correlation meeting or exceeding a predetermined threshold R for a given frame, the system determines that the vehicle is likely to be in the location where it was originally detected. In response to the cross-correlation being below predetermined threshold R for the given frame, the system determines that the detected vehicle moved away from its original location. In this latter instance, the vehicle is in motion and cannot be double-parked.

For the discussed embodiment where the stationary vehicle is detected using a tracking algorithm (FIG. 8B), the system estimates the number of frames where motion associated with the detected vehicle is absent.

Both the correlation and the tracking operations can be affected by moving occlusions, in which case additional measures of robustness can be implemented. For example, the determination that a vehicle moved away from its location can be performed only if the cross-correlation value is below the predetermined threshold R for a given number of consecutive frames N.

The module calculates the number of frames that the vehicle is stationary by the frame rate of the image capture device to compute the duration that the vehicle remained stationary within the enforcement area at S414. However, there is no limitation to the process used for computing the duration, which can be calculated using alternative forms of input instead of the frame rate. For example, the duration can be determined using system clocks and/or time-stamps.

The module 120 compares the computed duration to a time threshold T at S416. In response to the duration meeting and/or exceeding the time threshold (YES at S416), the detected vehicle is classified as being a candidate violator at S418. In response to the duration being below the time threshold (NO at S426), the detected vehicle is determined as not being double parked at S426.

One aspect of the disclosure is that the vehicle is first labeled as a candidate violator to avoid making false violations. Given the estimated region that the candidate vehicle occupies, additional violation evidence/indicators are analyzed at S420.

The disclosure confirms a double parking violation of the candidate vehicle based on the occurrence of an event. This event can include a presence of traffic patterns being affected, such as, by a nearby signal light causing the vehicle(s) and/or traffic to stop and/or back-up around the candidate vehicle. This event can include the operation of hazard (warning) lights (flashers) on the detected vehicle or another detected vehicle behind the detected vehicle, which indicates a hazard such as the vehicle being stopped in or near moving traffic. Another contemplated event can include traffic moving around the detected vehicle, indicating that the vehicle is stopped and obstructing traffic flow.

Figure 6A:
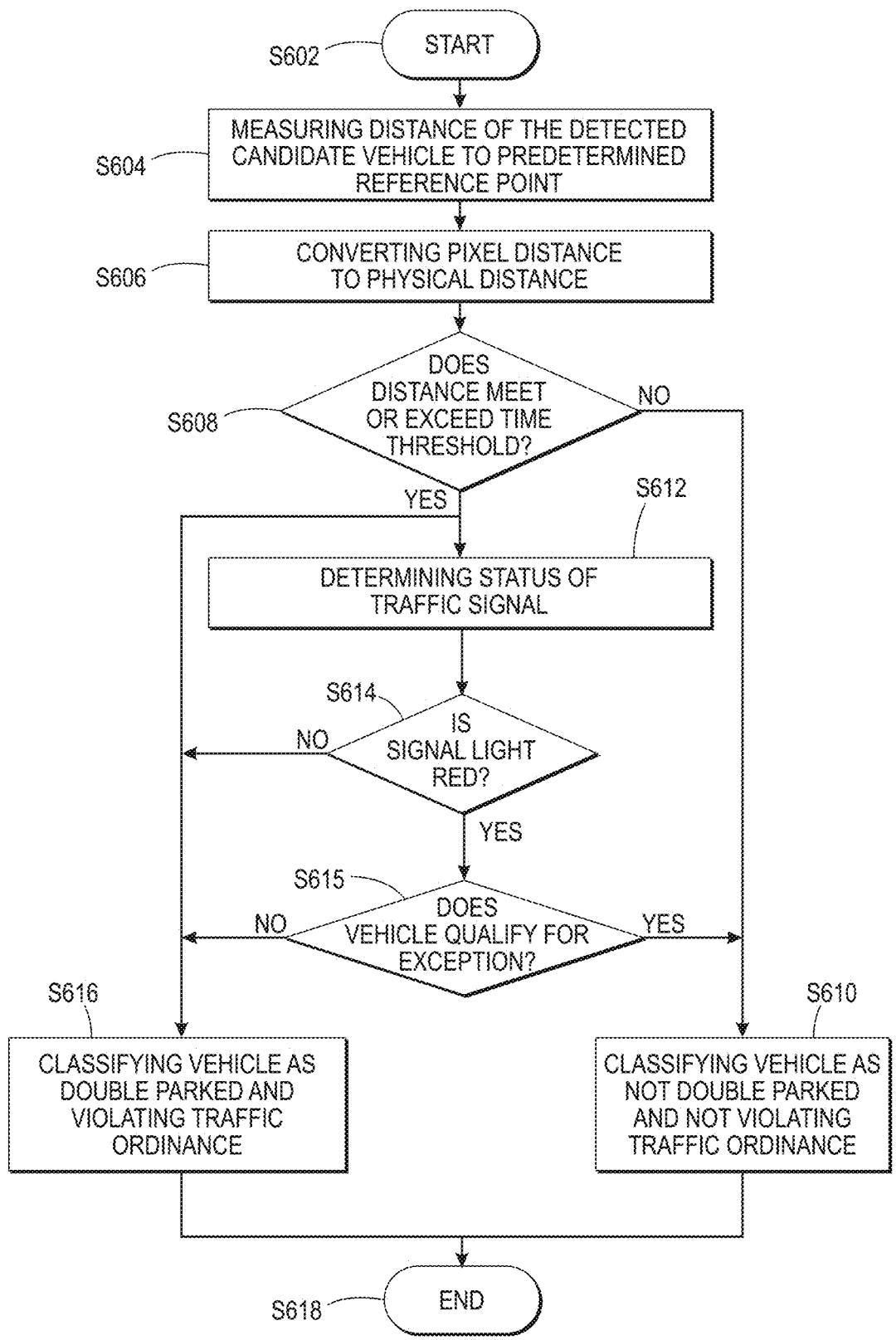
FIG. 6A shows a method for confirming a double parking violation of a candidate vehicle based on traffic signals and signs.
Figure 6B:
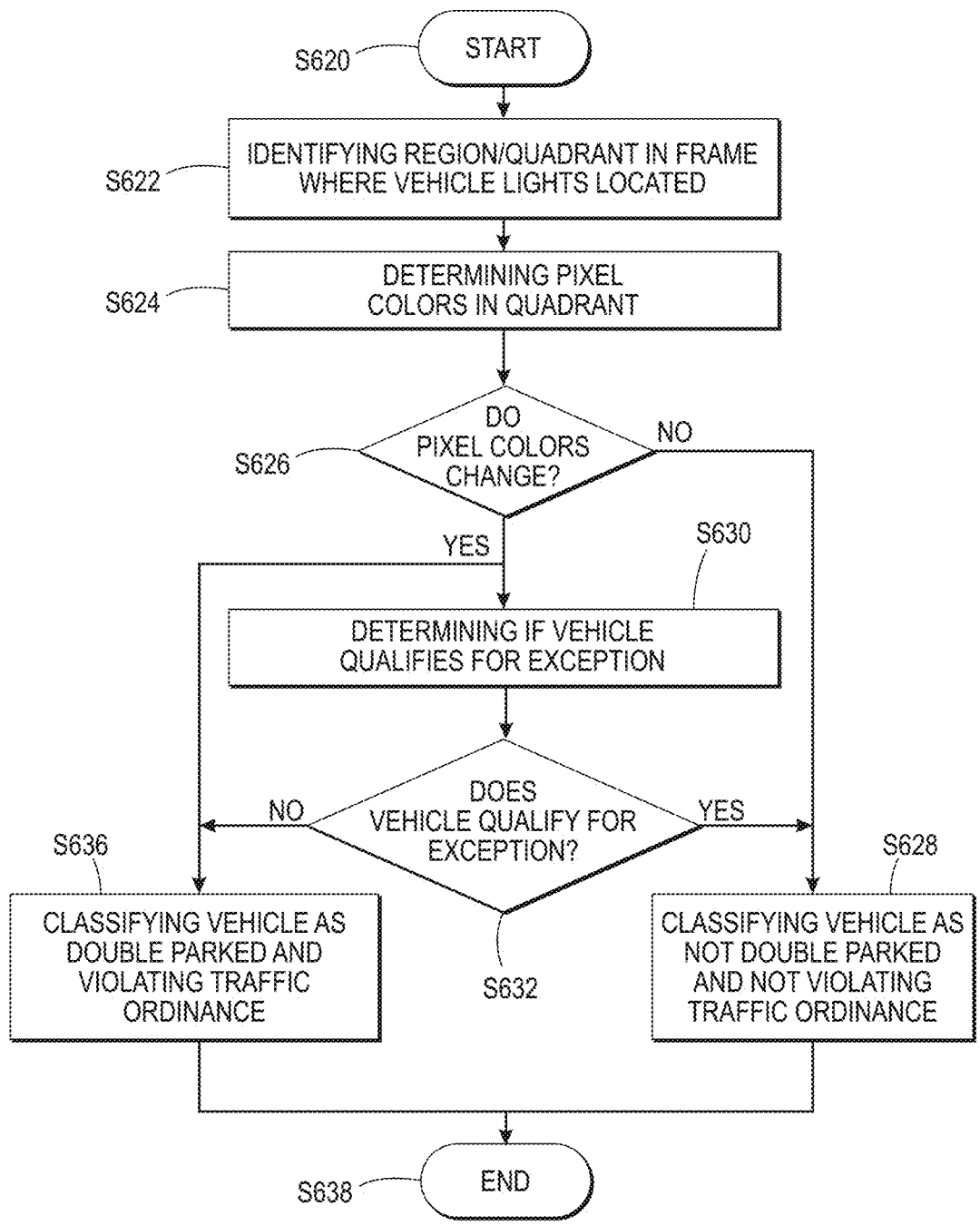
FIG. 6B shows a method for confirming a double parking violation of a candidate vehicle based on hazard lights.
Figure 6C:
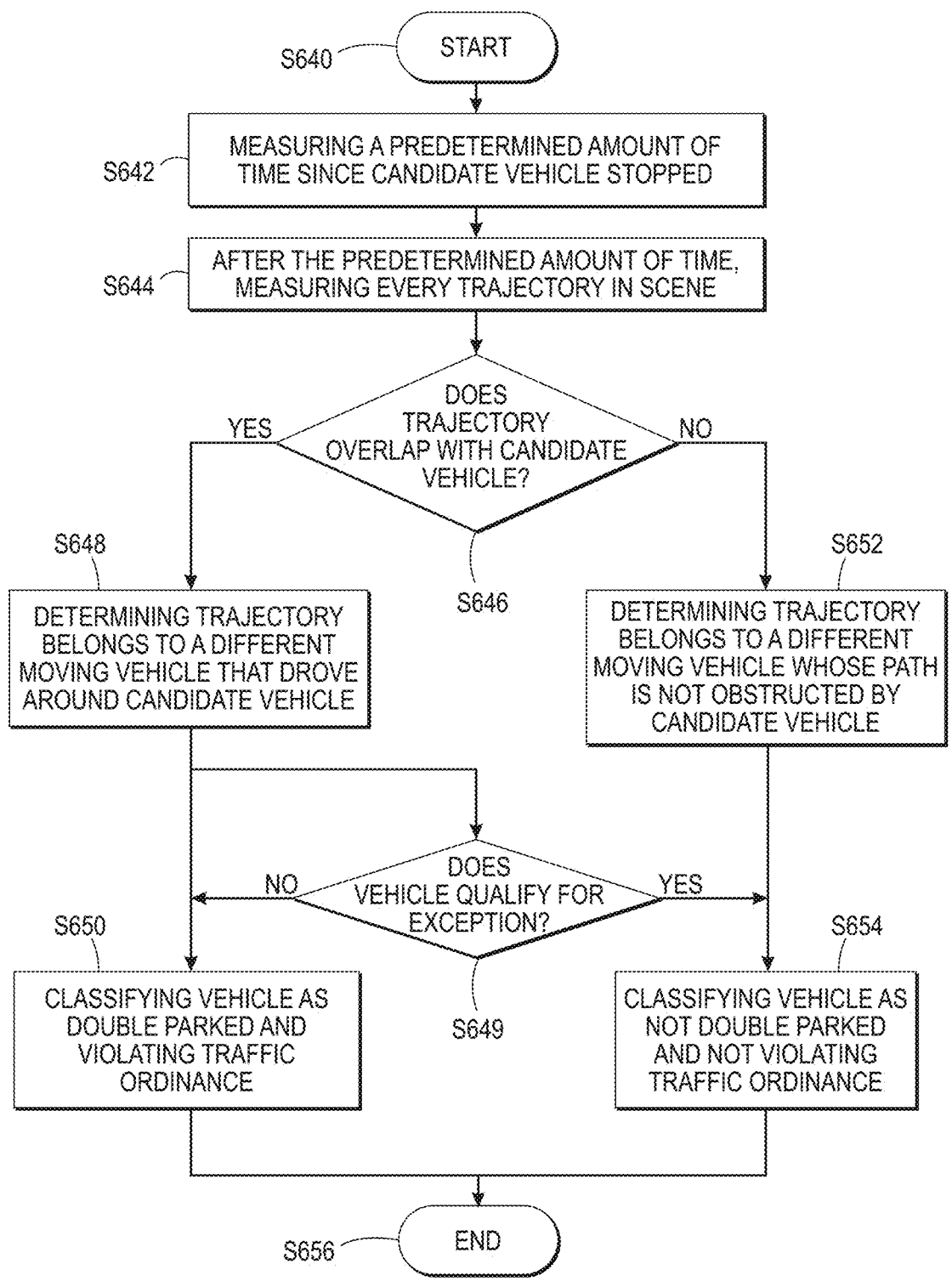
FIG. 6C shows a method for confirming a double parking violation of a candidate vehicle based on traffic patterns.
Figure 7A:
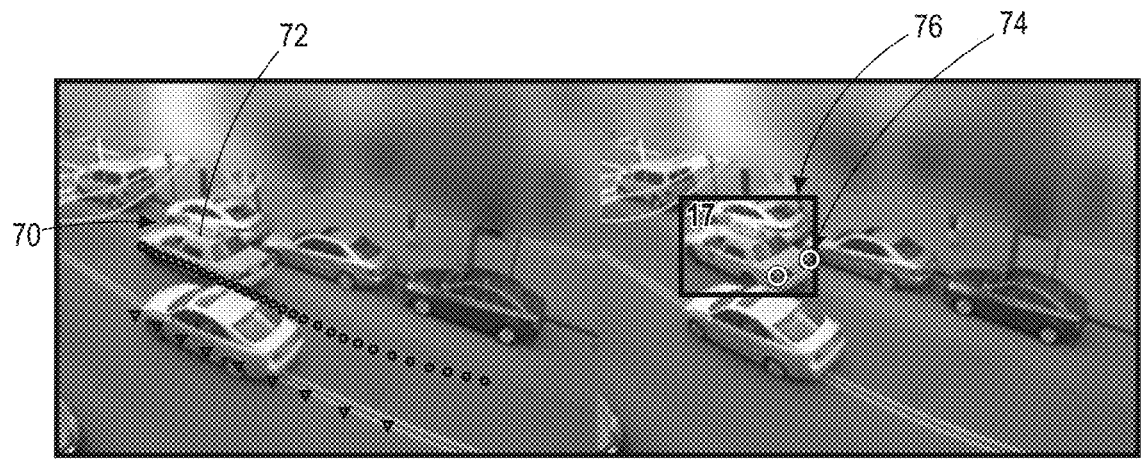
FIG. 7A shows a sample frame where hazard lights are detected and indicated as operating on a candidate vehicle.
Figure 7B:
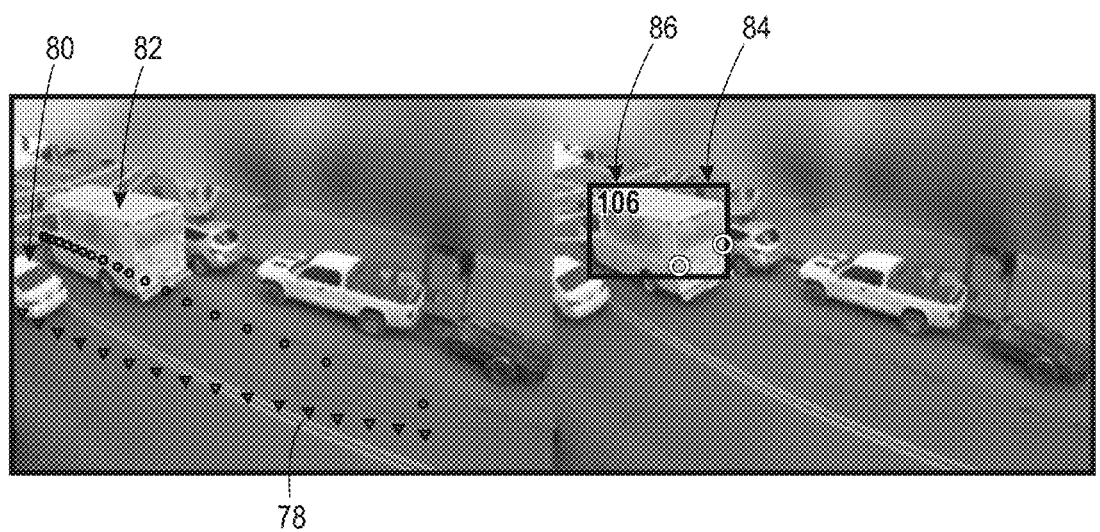
FIG. 7B shows a sample frame where a trajectory indicates a moving vehicle driving around a candidate vehicle.

FIGS. 6A-6C is a flow chart showing method embodiments for confirming the double parking violation using analyses focused on portions of the enforcement region, portions around the enforcement region, and the vehicle itself. FIG. 6A shows a flow chart for confirming the double parking violation using a segment of the enforcement area located near the detected stationary vehicle. The method starts at S602. In a first embodiment, the classification module 122 confirms the double parking violation of the candidate vehicle by analyzing the portion of the road, and particularly the enforcement area, in front of the stationary vehicle. The results of this analysis can indicate whether the vehicle is stopped for a signal light or behind another stopped vehicle. Particularly, the occupancy of the road in front of the stationary vehicle is analyzed while considering available signal light information. For the occupancy determination, the classification module 122 measures a distance of the detected stationary vehicle to a predetermined reference point at S604. In other words, the module 122 determines whether there is unoccupied roadway between the detected stationary vehicle and the reference point. Example reference points can include an intersection, a sign, a painted stop line, and a signal light when the light is red or yellow, etc. The distance is measured by calculating a number of pixels from the closest edge of the estimated region of the detected stationary vehicle (e.g., the edge extending proximately along the front of the vehicle) to the predetermined reference position, or image frame boundary. The pixel distance is converted to a physical distance using a LUT or predetermined algorithm at S606. The physical distance is compared to a threshold where camera calibration data is available at S608. Alternatively, the calculated number of pixels not need be converted to a physical distance; rather, the pixel distance can be compared to a threshold in pixel units, where the pixel unit threshold can be learned from the video data by tracking lengths of objects captured near the enforcement area in front of the stationary vehicle, or behind the reference point, or between the vehicle and the reference point, in the image frames. These thresholds can be predetermined based on calibration information, manually provided to the system as operator input at the time of installation or during run-time, or computed by the system by default. In response to the length/distance being below the threshold (NO at S608), the module 122 classifies the detected stationary vehicle as not being double parked at S610. If the length of unoccupied roadway meets or exceeds the threshold (YES at S608), the module 112 classifies the detected stationary vehicle as being in violation of a traffic ordinance (i.e., being double parked) at S616. The unoccupied roadway in front of the vehicle means that there is no other vehicle or obstruction in front of the detected vehicle that is causing it to be stationary. FIGS. 7A and 7B illustrate this example in sample frames of acquired video. A significant amount (e.g., greater than one car length) of unoccupied space 70 can be observed in front of candidate vehicle 72 in the enforcement region in FIG. 7A.

In one embodiment, the traffic signal data, such as the status or timing of signal lights, such as a time or duration of a nearby yellow light and red light, can be coordinated with the analyses results to determine whether the detected stationary vehicle or a detected vehicle in front of the vehicle of interest are stopped as a result of the signal light. The status of the signal and/or traffic light can be communicated to the system in advance as part of timing and scheduling information or can be communicated to the system in real time via communication links with the traffic light control system. Alternatively, the status of the traffic signal can be determined using image and/or video analysis if a view of the traffic light is available at S612. Therefore, if the unoccupied space in front of the vehicle is above the threshold (YES at S608), but the signal information indicates that the light is red (YES at S614), the module 122 can classify the vehicle as not being double parked at S610. However, if the unoccupied space meets or exceeds the threshold (YES at S608), and the signal information indicates that the light is green (NO at S614), then the module 122 determines that the vehicle is double parked at S616. There may be a valid reason why the vehicle is double parked. Therefore, in another embodiment, in response to a determination that the vehicle is double parked (YES at S608) and (NO at S614), the module 122 determines whether the stationary vehicle is of a type that qualifies for an exception at S615. For example, emergency vehicles may be a type of vehicle that qualifies for an exception. Examples of methods to detect emergency vehicles using video are disclosed in "Image Processing Edge Detection Technique used for Traffic Control Problem," P. Srinivas, et al., International Journal of Computer Science and Information Technologies, Vol. 4 (1), 17-20 (2013); "Image Processing Based Intelligent Traffic Controller", Vikramaditya Dangi, et al., Academic Research Journal, Vol. 1 (1) (2012); and, http://www.uwindsor.ca/dailynews/2013-08-09/student-designed-system-would-warn-drivers-about-emergency-vehicles, the contents of which are all incorporated herein.

For another example, certain commercial vehicles, such as delivery vehicles, may be permitted to park in the enforcement region for predetermined amounts of time during certain hours. A regulation or ordinance may permit these vehicles to temporarily park in regions that provide no alternative space. The exceptions for the monitored enforcement region are stored in the storage device and are accessed by the module 122 when determining whether the vehicle qualifies for an exception. In response to the stationary vehicle qualifying for an exception (YES at S615), the module 122 classifies the stationary vehicle as not being double parked and not in violation of a traffic rule at S610. In response to the stationary vehicle not qualifying for an exception (NO at S615), the module 122 classifies the stationary vehicle as being double parked and in violation of a traffic rule at S616. The method ends at S618.

FIG. 6B shows a flow chart for confirming the double parking violation by determining whether hazard warning lights are operating on the detected stationary vehicle. More particularly, a detection of a stationary vehicle with activated hazard/warning lights in the enforcement area indicates that the vehicle is double parked, or the vehicle may otherwise require attention. The method starts at S620. The module 122 identifies a hazard light region in the sequence of frames surrounding one of a front light and rear light area on the detected vehicle at S622. A pixel analysis is performed within this region, referred hereafter as a (e.g., lower right) quadrant, to avoid a computationally expensive (depending on the spatial and temporal resolution of the video) process across all pixels. While the detection of hazard lights can be achieved using pixel-wise Fourier analysis of a video segment of a specific length (e.g., 50 frames for a 5-fps video acquisition), the system replaces the Fourier analysis with a simple test based on a standard deviation and a ratio of the standard deviation to the range (max-min) of the temporal intensity signal for every pixel being processed. This approach relies on the assumptions that (1) the pixel-wise intensities corresponding to a stopped vehicle are near constant (except when occlusion occurs or when hazard warning lights are activated), and that (2) the standard deviation of a periodic signal is a scaled version of the amplitude of this periodic signal. Other methods of detecting periodic intensity changes can be used to detect active hazard lights as well since the temporal color/intensity signals of an active hazard light will exhibit such periodic characteristics. Furthermore, additional processing, such as, morphological filtering, connected component analysis, size or number of pixels thresholding, etc., can be applied to the resulting pixel classification of active hazard lights to yield more robust detection of the active hazard lights.

Therefore, the system performs the pixel-wise analysis within the identified quadrant of the estimated region corresponding to the detected stopped vehicle. More particularly, the module 122 determines pixel colors in the quadrant in the sequence of frames at S624. In response to no changes in the pixel colors between frames (i.e., the pixel color is constant across frames) (NO at S626), the module 122 determines that the detected vehicle is not operating its hazard lights and classifies the vehicle as not being double parked at S628. In response to changes in the pixel colors between frames (YES at S626), the module 122 determines that the detected vehicle is operating its hazard lights, and classifies the vehicle as being double parked at S636.

FIG. 7A indicates hazard lights 74 that were detected as operating. In other words, for a candidate violator vehicle operating its hazard lights, the module 122 elevates the vehicle status from a "candidate" to a "violator". However, the hazard lights may indicate that the vehicle requires attention. In one embodiment, in response to a determination that the vehicle is operating its hazard lights, the module 122 determines whether the stationary vehicle is of a type that qualifies for an exception at S630. In response to the stationary vehicle qualifying for an exception (YES at S632), the module 122 classifies the stationary vehicle as not being double parked and not in violation of a traffic rule at S628. In response to the stationary vehicle not qualifying for an exception (NO at S632), the module 122 classifies the stationary vehicle as being double parked and in violation of a traffic rule at S636. The method ends at S638.

FIG. 6C shows a method for confirming a double parking violation of a candidate vehicle based on surrounding traffic patterns relative to the candidate violator. For example, another vehicle moving around the detected stationary vehicle would indicate the stationary vehicle is double parked.

Because the stationary candidate violator vehicle can be detected via a tracking process in the disclosure, the module 122 may check trajectories of all vehicles entering the scene. These trajectories indicate vehicles that are stopped or moving in the traffic lanes of interest. Therefore, the system uses the trajectories to determine whether a vehicle(s) moves or moved around the candidate violator vehicle. The method starts at S640. In response to the detected candidate violator stopping, the system starts a timer. The timer is used to measure a predetermined amount of time since the candidate vehicle has stopped at S642. In the example embodiment, the predetermined time is duration of 15 seconds, but there is no limitation made herein to the amount of time. After the predetermined amount of time passes since the timer starts, and while it continues running, every trajectory that exited or exits the scene is tested at S644 to determine if it overlaps with the estimated position of the candidate violator vehicle, meaning a moving vehicle is located within proximity to the stationary vehicle in the enforcement region. In other words, the system is detecting at least a second vehicle corresponding to another trajectory in the sequence of frames.

Similarly, any trajectory that is lost for more than a predetermined time, such as a few seconds, and more particularly 2 seconds, is also tested relative to the estimated position of the candidate violator vehicle. The trajectories are analyzed to determine if they pass a front of, i.e., move around, the candidate violator vehicle at S646. In FIG. 7A, for example, the front of a candidate violator vehicle is illustrated as the left-most pixel in the identified region 76. If a trajectory and the candidate violator vehicle overlap (YES at S646), the module 122 determines that the trajectory belongs to a moving vehicle that drove around the candidate violator vehicle at S648 because the latter is stopped and obstructing the flow of traffic. FIG. 7B shows a trajectory 78 of a moving vehicle 80 virtually marked within the sample frame and indicating that the path of the moving vehicle goes around candidate vehicle 82. In response to a detection of this traffic flow pattern around a candidate violator vehicle, the module 22 changes the detected stationary vehicle status from "candidate" to "violator". The stationary detected vehicle is classified as being double parked and in violation of a traffic regulation at S650. However, there may be a valid reason why the flow pattern is moving around the violator vehicle. For example, the violator vehicle can actually be a construction vehicle associated with a crew working on the road or on sewers next to the road. In one embodiment, in response to a determination that vehicles are driving around the candidate vehicle (at S648), the module 122 determines whether the stationary vehicle is of a type that qualifies for an exception at S649. In response to the stationary vehicle qualifying for an exception (YES at S649), the module 122 classifies the stationary vehicle as not being double parked and not in violation of a traffic rule at S664. In response to the stationary vehicle not qualifying for an exception (NO at S649), the module 122 classifies the stationary vehicle as being double parked and in violation of a traffic rule at S6650.

If the trajectory and the candidate violator vehicle do not overlap (NO at S646), the module 122 determines that the trajectory belongs to a moving vehicle whose path is not obstructed by the stationary vehicle at S652. The identified status of the detected stationary vehicle remains as "candidate" at S654.

In one embodiment, the number of vehicles that move around the stationary detected vehicle is counted and displayed to a user. FIG. 7 illustrates this count on the image frame in one example.

Though FIG. 6A-6C are described as independent decision-making processes, where each process concludes whether a candidate violator is deemed to be a violator or not, the final decision can be a combination of the outcomes of all three processes. For example, the final decision can be based on a majority vote from all three processes. In another example, the candidate vehicle can be declared as a violator if the outcome for any one (or any two or all three) processes classify the vehicle status as belonging to a violating vehicle. In yet another example, the decision may be based on the confidence of a combination of detections of events. The confidence can be measured using the distance between the candidate vehicle and the reference point, which can be determined as part of the process described for FIG. 6A; and the confidence can be measured using the number vehicle that move around the candidate violator, which can be determined as part of the process described for FIG. 6C.

Although we describe FIG. 6A-6C as independent decision-making processes that can process in any order, it may be beneficial to perform them in parallel in the computing device or perform in a specific sequence. For example, one may perform the process from FIG. 6A first due to its simplicity of computation. If the distance exceeds a threshold, then stop and declare a violation. If not, proceed with FIG. 6B. Similarly, based on the results and confidences of the results, a violation may be declared or continue with FIG. 6C.

In addition to the evidence enumerated above, in multi-lane traffic scenarios, traffic flow differences between the enforcement area and the adjacent traffic lane can also be used as an indication of violation. This determination could be used instead of or in addition to the drive-around detection described for the single-lane traffic scenario. The method ends at S656.

Returning to FIG. 4, after the system analyzes the event at S420, it determines whether the evidence of the event confirms a double parking violation of the candidate vehicle based on the evidence at S422. In response to the evidence confirming the candidate vehicle is double parked (YES at S422), the system determines whether the candidate vehicle is of a type that qualifies for an exception at S423. In response to the stationary vehicle not qualifying for an exception (NO at S423), the notification module issues a violation notification to a user through the communication link to the output device at S424. The violation notification can be issued in various forms. In one embodiment, the violator vehicle can be identified using image analysis techniques for license plate recognition. Once the license number is identified, a fine or warning can be sent to the registrant of the vehicle. In another embodiment, the notification is sent by the notification module 124 to the transportation authority or law enforcement, which can visit the scene to take appropriate action. In another embodiment, the information can be sent to an analyst that monitors and studies traffic flow patterns. In response to the stationary vehicle qualifying for an exception (YES at S423), the vehicle is classified by the vehicle classification module 122 as not being double parked at S426.

In response to the evidence confirming the candidate vehicle is not double parked (NO at S422), the vehicle is classified by the vehicle classification module 122 as not being double parked at S426. The method ends at S428.

One aspect of the disclosure is that it analyzes evidence of secondary considerations to increase the robustness of a double parking decision for the purpose of determining whether a stationary vehicle is in violation of a regulation in an enforcement area. Specifically, detection of hazard lights, empty road space in front of the detected stationary vehicle, coordination with traffic light information, awareness of distance to the nearest intersection, and analysis of patterns of motion of surrounding traffic can be used to improve the accuracy of the decision. Another aspect of this process is that it provides greater flexibility in defining the enforcement region.

Although the method (FIGS. 2, 4, 6A-C and 8A-B) is illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method for detecting a double-parked vehicle, the method comprising:
   at a server computer, executing instructions for:
      identifying a parking region in video data received from an image capture device monitoring the parking lane;
      defining an enforcement traffic lane at least partially surrounding the parking lane;
      detecting a stationary candidate double-parked vehicle in the enforcement lane, the detecting including:
         detecting a presence of vehicles in a difference image formed between a selected frame and a background estimate,
         generating a binary image using the difference image, and
         determining if each detected vehicle is moving or stationary using the binary image and a current frame, wherein the current frame is different from the selected frame;
      in response to the detected vehicle being stationary, performing a normalized cross-correlation between a first frame where the vehicle was detected and subsequent frames to determine a duration the detected vehicle remains stationary, the determining including:
         in response to the cross-correlation meeting or exceeding a predetermined threshold for a given frame, determining that the detected vehicle has not moved away from a location where it was originally detected and is a candidate violator, and
         calculating the duration based on a number of frames that the detected vehicle remained stationary;
      in response to the duration meeting a predetermined time threshold, determining whether hazard lights are operating on the candidate violator; and,
      in response to the hazard lights operating on the candidate violator, classifying the detected vehicle as being double-parked.

2. The method of claim 1, wherein the determining whether the hazard lights are operating includes:
   identifying a hazard light region in the sequence of frames surrounding one of a front light and rear light; and,
   determining pixel colors in the hazard light region in the sequence of frames.

3. The method of claim 1 further comprising:
   in response to the hazard lights operating on the candidate violator, determining if the candidate violator is one of an emergency vehicle and a commercial vehicle; and
   in response to the candidate violator being one of the emergency vehicle and the commercial vehicle, classifying the detected vehicle as being double-parked.

4. The method of claim 1, wherein the determining the occurrence of the event includes:
   detecting a second stationary vehicle in the parking lane located within proximity to the candidate violator in the enforcement lane.

5. The method of claim 1, wherein the detecting the vehicle is performed using one of background estimation and subtraction, tracking, temporal difference, optical flow, and an initialization process.

6. The method of claim 1, wherein the detecting the vehicle includes:
 determining a number of frames the detected vehicle is located in a same position;
 comparing the number of frames to a threshold; and,
 in response to the number of frames meeting or exceeding the threshold, classifying the detected vehicle as the candidate violator.

7. The method of claim 1 further comprising:
 in response to the candidate violator being classified as double-parked, associating the detected vehicle as being a double-parked vehicle and providing the user with a notification as output.

8. The method of claim 1, further comprising:
 considering multiple events for confirming whether the candidate violator is double-parked.

9. A system for detecting a double-parked vehicle, the system comprising:
 a computer including at least one processor adapted to execute a set of instructions stored in a memory, the computer:
  identifying a parking lane and an enforcement traffic lane at least partially surrounding the parking lane in a sequence of frames received from an image capture device monitoring the parking lane;
  detecting a stationary candidate double-parked vehicle in the enforcement lane, the detecting including:
   detecting a presence of vehicles in a difference image formed between a selected frame and a background estimate,
   generating a binary image using the difference image, and
   determining if each detected vehicle is moving or stationary using the binary image and a current frame, wherein the current frame is different from the selected frame;
  in response to the detected vehicle being stationary, performing a normalized cross-correlation between a first frame where the vehicle was detected and subsequent frames to determine a duration the detected vehicle remains stationary, the determining including:
   in response to the cross-correlation meeting or exceeding a predetermined threshold for a given frame, determining that the detected vehicle has not moved away from a location where it was originally detected and is a candidate violator, and calculating the duration based on a number of frames that the detected vehicle remained stationary;
  in response to the duration meeting a predetermined time threshold, determining whether a second vehicle is located in front of the candidate violator; and,
  in response to a distance between the second vehicle and the stationary candidate double-parked vehicle being below a predetermined distance threshold, classify the detected vehicle as not being double-parked.

10. The system of claim 9 wherein the processor is operative to:
 in response to the distance between the second vehicle and the candidate violator being above the predetermine distance threshold, determine if the candidate violator is one of an emergency vehicle and a commercial vehicle; and in response to the candidate violator being one of the emergency vehicle and the commercial vehicle, classify the detected vehicle as not being double-parked.

11. The system of claim 9, wherein the processor is further operative to:
 in response to the distance between the second vehicle and the candidate being equal to or above the predetermined distance threshold, determine if the object is a stop light;
 determine pixel colors in the stop light region in the sequence of frames; and,
 in response to the pixel colors being green, classify the candidate violator as being double-parked.

12. The system of claim 9, wherein the computer is further programmed to detect the stationary candidate double-parked a vehicle using background estimation and subtraction, temporal difference, optical flow, and an initialization process.

13. The system of claim 9, wherein the computer is further programmed to:
 in response to the candidate violator being classified as double-parked, associate the detected vehicle as being a double-parked vehicle and provide the user with a notification as output.

14. The system of claim 9, wherein the computer is further programmed:
 consider multiple events for confirming whether the detected vehicle is double-parked.

15. The system of claim 9 further comprising an output device for providing the classification to a user.

16. A computer-implemented method for detecting a double-parked vehicle, the method comprising:
 at a server computer, executing instructions for:
  identifying a parking region in video data received from an image capture device monitoring the parking lane;
  defining an enforcement traffic lane at least partially surrounding the parking lane;
  detecting a stationary candidate double-parked vehicle in the enforcement lane, the detecting including:
   detecting a presence of vehicles in a difference image formed between a selected frame and a background estimate,
   generating a binary image using the difference image, and
   determining if each detected vehicle is moving or stationary using the binary image and a current frame, wherein the current frame is different from the selected frame;
  in response to the detected vehicle being stationary, performing a normalized cross-correlation between a first frame where the vehicle was detected and subsequent frames to determine a duration that the detected vehicle remains stationary, the determining including:
   in response to the cross-correlation meeting or exceeding a predetermined threshold for a given frame, determining that the detected vehicle has not moved away from a location where it was originally detected and is a candidate violator, and calculating the duration based on a number of frames that the detected vehicle remained stationary;
  in response to the duration meeting a predetermined time threshold, searching for a second vehicle in the sequence of frames;
  determining a trajectory of the second vehicle relative to the candidate violator across a number of frames;

determining whether the trajectory moves around the candidate violator; and, in response the trajectory moving around the candidate violator, classifying the detected-vehicle as being double-parked.

17. The method of claim 16 further comprising:

in response the trajectory not moving around the candidate violator, determining if the candidate violator is one of an emergency vehicle and a commercial vehicle; and in response to the candidate violator being one of the emergency vehicle and the commercial vehicle, classifying the detected vehicle as not being double-parked.

18. The method of claim 16 further comprising:

detecting a second stationary vehicle in the parking lane located within proximity to the detected vehicle in the enforcement lane.

19. The method of claim 16, wherein the detecting each vehicle is performed using one of background estimation and subtraction, tracking, temporal difference, optical flow, and an initialization process.

20. The method of claim 16 further comprising:

in response to the candidate violator being classified as double-parked, associating the detected vehicle as being a double-parked vehicle and providing the user with a notification as output.

21. The method of claim 1 further comprising:

considering multiple events for confirming whether the candidate violator is double-parked.

22. The system of claim 21, wherein the multiple events are selected from a group consisting of:

hazard lights detected as operating on the candidate violator;

a detected object located in front of the candidate violator; and a combination of the above.

23. The method of claim 9, wherein the multiple events are selected from a group consisting of:

a detected object located in front of the candidate violator;

a tracked object located in front of the candidate violator; and a combination of the above.

24. The method of claim 14, wherein the multiple events are selected from a group consisting of:

hazard lights detected as operating on the candidate violator;

a tracked object moving around the candidate violator; and a combination of the above.

* * * * *